United States Patent
Greene et al.

(10) Patent No.: US 9,346,552 B2
(45) Date of Patent: May 24, 2016

(54) AUTOTHROTTLE RETARD CONTROL

(71) Applicant: SAFE FLIGHT INSTRUMENT CORPORATION, White Plains, NY (US)

(72) Inventors: Randall A. Greene, Greenewich, CT (US); Shawn P. Beyer, New York, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 50 days.

(21) Appl. No.: 14/251,533

(22) Filed: Apr. 11, 2014

(65) Prior Publication Data

US 2015/0291287 A1    Oct. 15, 2015

(51) Int. Cl.
| | |
|---|---|
| *G05D 1/06* | (2006.01) |
| *G01S 13/88* | (2006.01) |
| *B64D 31/06* | (2006.01) |
| *B64D 45/04* | (2006.01) |
| *G05D 1/00* | (2006.01) |
| *G05D 1/10* | (2006.01) |
| *G01C 5/00* | (2006.01) |

(52) U.S. Cl.
CPC .............. *B64D 31/06* (2013.01); *G05D 1/0055* (2013.01); *G01C 5/005* (2013.01); *G01S 13/882* (2013.01); *G05D 1/0676* (2013.01); *G05D 1/101* (2013.01)

(58) Field of Classification Search
CPC ... G05D 1/0676; G05D 1/101; G05D 1/0005; G05D 1/0858; G05D 1/042; G05D 1/0661; G05D 1/0808; G05D 1/0055; G01C 5/005; G01S 13/882
See application file for complete search history.

(56) References Cited

U.S. PATENT DOCUMENTS

| | | | |
|---|---|---|---|
| 3,665,465 A | 5/1972 | Miller | |
| 3,691,356 A | 9/1972 | Miller | |
| 3,805,033 A | 4/1974 | Manke et al. | |
| 3,934,221 A | 1/1976 | Bateman et al. | |
| 3,936,797 A | 2/1976 | Andresen, Jr. | |
| 4,319,218 A | 3/1982 | Bateman | |
| 4,431,994 A | 2/1984 | Gemin | |
| 4,536,843 A | 8/1985 | Lambregts | |
| 4,551,723 A | 11/1985 | Paterson | |
| 4,675,823 A | 6/1987 | Noland | |
| 4,764,872 A * | 8/1988 | Miller | 701/3 |
| 5,020,747 A | 6/1991 | Orgun et al. | |
| 5,031,102 A | 7/1991 | Robbins et al. | |
| 5,038,141 A | 8/1991 | Grove | |
| 5,187,478 A | 2/1993 | Grove | |
| 5,220,322 A | 6/1993 | Bateman et al. | |
| 5,402,116 A | 3/1995 | Ashley | |
| 5,781,126 A | 7/1998 | Paterson et al. | |
| 6,186,447 B1 * | 2/2001 | Virdee | 244/188 |
| 6,216,064 B1 | 4/2001 | Johnson et al. | |
| 6,462,703 B2 | 10/2002 | Hedrick | |
| 6,507,289 B1 | 1/2003 | Johnson et al. | |
| 6,711,479 B1 | 3/2004 | Staggs | |
| 6,845,304 B1 | 1/2005 | Young | |

(Continued)

*Primary Examiner* — James Trammell
*Assistant Examiner* — Demetra Smith-Stewart
(74) *Attorney, Agent, or Firm* — Morrison & Foerster LLP

(57) ABSTRACT

An autothrottle retard initiation method includes receiving an aircraft's ground speed, receiving the aircraft's vertical speed, determining autothrottle retard initiation height based on the aircraft's ground speed, the aircraft's vertical speed, and an aircraft vertical landing speed factor, receiving the aircraft's height above ground, and initiating autothrottle retard when the aircraft's height above ground and the autothrottle retard initiation height are equal.

90 Claims, 8 Drawing Sheets

(56) References Cited

U.S. PATENT DOCUMENTS

| | | |
|---|---|---|
| 6,999,023 B2 | 2/2006 | Block |
| 7,088,264 B2 | 8/2006 | Riley |
| 7,725,220 B2 | 5/2010 | Petrich et al. |
| 8,027,756 B2 | 9/2011 | Davis et al. |
| 8,126,600 B2 | 2/2012 | Conner et al. |
| 8,321,071 B2 | 11/2012 | Klooster |
| 8,478,458 B2 | 7/2013 | Faurie et al. |
| 8,494,693 B2 | 7/2013 | Murphy |
| 8,630,756 B2 | 1/2014 | Fleiger-Holmes et al. |
| 8,660,722 B2 * | 2/2014 | Dumoulin et al. ............. 701/16 |
| 8,723,695 B2 | 5/2014 | Bourret et al. |
| 8,788,128 B1 | 7/2014 | McCusker |
| 2002/0075171 A1 | 6/2002 | Kuntman et al. |
| 2002/0077731 A1 | 6/2002 | Hilb |
| 2003/0206119 A1 | 11/2003 | Riley |
| 2004/0070521 A1 * | 4/2004 | Greene ....................... 340/969 |
| 2006/0041345 A1 | 2/2006 | Metcalf |
| 2006/0052912 A1 | 3/2006 | Meunier |
| 2006/0271249 A1 | 11/2006 | Testrake et al. |
| 2007/0239326 A1 | 10/2007 | Johnson et al. |
| 2008/0243316 A1 | 10/2008 | Sacle et al. |
| 2009/0138144 A1 | 5/2009 | Flannigan et al. |
| 2009/0262008 A1 | 10/2009 | Thomas et al. |
| 2011/0029158 A1 * | 2/2011 | Klooster ............. G05D 1/0676 701/3 |
| 2011/0077858 A1 * | 3/2011 | Coulmeau et al. ..... G05D 1/101 701/465 |
| 2011/0251740 A1 | 10/2011 | Gomez Ledesma et al. |
| 2012/0053760 A1 * | 3/2012 | Burnside et al. .................. 701/3 |
| 2012/0056760 A1 | 3/2012 | Bourret et al. |
| 2012/0265374 A1 * | 10/2012 | Yochum ............... G05D 1/0005 701/5 |
| 2013/0274964 A1 | 10/2013 | Jesse et al. |
| 2014/0172202 A1 * | 6/2014 | Greene ................. B64D 31/06 701/4 |

* cited by examiner

AUTOTHROTTLE RETARD CONTROL

FIELD OF THE DISCLOSURE

This disclosure generally relates to systems and methods for landing an aircraft. More particularly, this disclosure relates to systems and methods for in-flight determination of a height to initiate autothrottle retard.

BACKGROUND

Autothrottles control thrust on an aircraft and are used in many sections of flight, including take-off, cruise, and landing. During landing, the autothrottle retards throttles so that airspeed and rate of descent are reduced. The aircraft then descends at a rate that results in a safe and gentle touch-down.

Typically, autothrottle retard is initiated once the aircraft reaches a predetermined height above the runway. Determining an appropriate height can be important. If retard initiation height is too low, then the plane may descend too rapidly. If initiation height is too high, then the plane may stall. Either scenario may lead to significant structural damage and fatalities.

The retard initiation height is usually fixed for a given aircraft and, for example, may be around 50 feet above the runway. A fixed height may not be appropriate for all landings, increasing the risk that pilots may need to take evasive maneuvers to land a plane safely.

SUMMARY

This disclosure relates to systems and methods for in-flight determination of a height to initiate autothrottle retard. Advantageously, the systems and methods may reduce the frequency with which pilots may need to take evasive maneuvers to land a plane safely.

In one embodiment, an autothrottle retard initiation method includes receiving an aircraft's ground speed, receiving the aircraft's vertical speed, determining autothrottle retard initiation height based on the aircraft's ground speed, the aircraft's vertical speed, and an aircraft vertical landing speed factor, receiving the aircraft's height above ground, and initiating autothrottle retard when the aircraft's height above ground and the autothrottle retard initiation height are equal.

In some embodiments, determining the autothrottle retard initiation height includes calculating an integral of the aircraft vertical landing speed factor from throttle retard initiation to touchdown.

In some embodiments, the aircraft's vertical landing speed factor represents a predetermined aircraft trajectory from the autothrottle retard initiation height to aircraft touchdown. In some further embodiments, the aircraft's flight path angle may be assumed constant from approach to touchdown, and the aircraft vertical landing speed factor at time t may be expressed as $$GS(t) \frac{VS_{AP}}{GS_{AP}} \quad \text{(Equation 1)}$$

where GS(t) is an aircraft ground speed factor at time t, $VS_{AP}$ is the aircraft's vertical speed during approach, and $GS_{AP}$ is the aircraft's ground speed during approach.

In some embodiments, the aircraft's flight path angle may change from approach to touchdown and the aircraft's vertical landing speed factor at time t may be expressed as $$GS(t)\tan(FPA(t)) \quad \text{(Equation 2)}$$

where GS(t) is an aircraft ground speed factor at time t and FPA(t) is the aircraft's flight path angle factor at time t.

In some embodiments, receiving the aircraft's vertical speed includes receiving the aircraft's inertial vertical speed. In some embodiments, receiving the aircraft's ground speed includes receiving an instantaneous aircraft ground speed. In some embodiments, receiving the aircraft's ground speed includes receiving an average aircraft ground speed.

In some embodiments, the method comprises determining autothrottle retard initiation height based on an aircraft weight.

In one embodiment, an autothrottle retard initiation system includes a first module that receives an aircraft's ground speed, a second module that receives the aircraft's vertical speed, a third module that determines autothrottle retard initiation height based on the aircraft's ground speed, the aircraft's vertical speed, and an aircraft vertical landing speed factor, a fourth module that receives the aircraft's height above ground, and a fifth module that initiates autothrottle retard when the aircraft's height above ground and the autothrottle retard initiation height are equal.

In some embodiments, the third module integrates the aircraft vertical landing speed factor from throttle retard initiation to touchdown.

In some embodiments, the aircraft's vertical landing speed factor represents a predetermined aircraft trajectory from the autothrottle retard initiation height to aircraft touchdown. In some further embodiments the aircraft vertical landing speed factor at time t may be represented by Equation 1. In some embodiments, the aircraft's vertical landing speed factor at time t may be expressed by Equation 2.

In some embodiments, the second module receives the aircraft's inertial vertical speed. In some embodiments, the first module receives an instantaneous aircraft ground speed. In some embodiments, the first module receives an average aircraft ground speed.

In one embodiment, an autothrottle retard initiation method includes receiving an aircraft's ground speed, determining an autothrottle retard initiation height, receiving the aircraft's height above ground, and initiating autothrottle retard when the aircraft's height above ground and the autothrottle retard initiation height are equal. In some embodiments, the autothrottle retard initiation height is determined using $$\frac{GS_{AP}^2 - GS_{TD}^2}{2A_{GS}}\tan(FPA) \quad \text{(Equation 3)}$$

where $GS_{AP}$ is the aircraft's ground speed during approach, $GS_{TD}$ is the aircraft's ground speed at touchdown, $A_{GS}$ is a constant aircraft inertial ground speed deceleration, and FPA is a constant aircraft flight path angle.

In one embodiment, an autothrottle retard initiation system includes a first module that receives an aircraft's ground speed, a second module that determines an autothrottle retard initiation height, a third module that receives an aircraft's height above ground, and a fourth module that initiates autothrottle retard when the aircraft's height above ground and the autothrottle retard initiation height are equal. In some embodiments, the autothrottle retard initiation height is determined using Equation 3.

In one embodiment, an autothrottle retard initiation method includes receiving an aircraft weight, receiving an aircraft ground speed, receiving an aircraft height above ground, determining an autothrottle retard initiation height based on the aircraft weight and aircraft ground speed, and initiating autothrottle retard when the aircraft height above ground and the autothrottle retard initiation height are equal. By considering an aircraft's weight and ground-speed in determining retard initiation height, some embodiments may advantageously determine a height more suitable for a specific landing situation. For example, a heavier aircraft approaching at a faster ground speed may require more time (and, consequently, more height) to land safely than a relatively lighter and slower-approaching aircraft.

In some embodiments, the method includes adjusting aircraft throttles to reduce airspeed at not greater than two knots per second after initiating autothrottle retard. In further embodiments, the method includes discontinuing autothrottle retard when airspeed has decreased by ten knots or greater after initiating autothrottle retard. In some embodiments, the method includes preventing throttle advancement after initiating autothrottle retard. In some embodiments, the method includes identifying contact between aircraft landing gear and a runway and retarding aircraft throttles to idle after contact between the aircraft landing gear and the runway. In some embodiments, receiving the aircraft weight includes at least one of receiving manually entered data, receiving data from an aircraft sensor, and receiving data from an external sensor.

In one embodiment, an autothrottle retard initiation system includes a first module that receives an aircraft weight, a second module that receives an aircraft ground speed, a third module that receives an aircraft height above ground, a fourth module that determines an autothrottle retard initiation height based on the aircraft weight and aircraft ground speed, and a fifth module that initiates autothrottle retard when the aircraft height above ground and the autothrottle retard initiation height are equal. By considering an aircraft's weight and ground-speed in determining retard initiation height, some embodiments may advantageously determine a height more suitable for a specific landing situation.

In some embodiments, the system includes a sixth module that adjusts aircraft throttles to reduce airspeed at not greater than two knots per second after the fifth module initiates autothrottle retard. In some embodiments, the system includes a seventh module that discontinues autothrottle retard when airspeed has decreased by ten knots or greater after the fifth module initiates autothrottle retard. In some embodiments, the system includes an eighth module that prevents throttle advancement after the fifth module initiates autothrottle retard. In some embodiments, the system includes a ninth module that identifies contact between aircraft landing gear and a runway and a tenth module that retards aircraft throttles to idle when the ninth module identifies contact between the aircraft landing gear is on the runway. In some embodiments, the first module receives the aircraft weight through at least one of manually entered data, data from an aircraft sensor, and data from an external sensor.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, a height to initiate autothrottle retard is determined in-flight. Advantageously, the systems and methods may reduce the frequency with which pilots need to take evasive maneuvers to land a plane safely.

Figure 1:
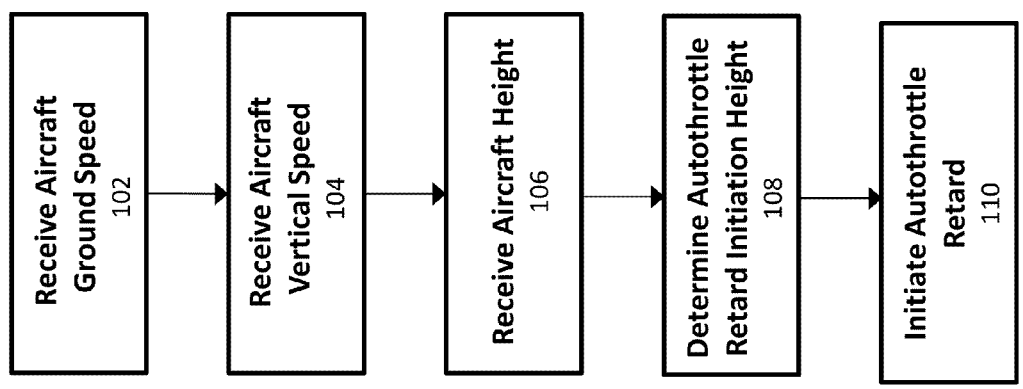
FIG. 1 depicts an autothrottle retard initiation method, in accordance with an embodiment.

In some embodiments, the height to initiate autothrottle retard is determined based upon a factor that considers the aircraft's ground speed and vertical speed. FIG. 1 depicts a method 100 for initiating autothrottle retard, in accordance with an embodiment. Method 100 may advantageously determine a height more suitable for a specific landing situation than the fixed height used in prior art methods.

Method 100 includes receiving the aircraft's ground speed 102. In some embodiments, receiving the aircraft's ground speed includes receiving an instantaneous aircraft ground speed. In some embodiments, receiving the aircraft's ground speed includes receiving an average aircraft ground speed over a period of time. In some embodiments, the aircraft ground speed may be provided by an airspeed indicator, E6B flight computer, or similar device. In most examples described herein, the received aircraft ground speed may also be referred to as the aircraft's ground speed at approach.

Method 100 includes receiving the aircraft's vertical speed 104. In some embodiments, receiving the aircraft's vertical speed includes receiving an instantaneous aircraft vertical speed. In some embodiments, receiving the aircraft's vertical speed includes receiving an average aircraft vertical speed over a period of time. In some embodiments, the vertical speed may be provided by a variometer or similar device. In some embodiments, receiving the aircraft's vertical speed includes receiving the aircraft's inertial vertical speed. In some embodiments, the inertial vertical speed may be provided by an inertial vertical speed indicator or similar device.

In most examples described herein, the received aircraft vertical speed may also be referred to as the aircraft's vertical speed at approach.

Method 100 includes determining autothrottle retard initiation height 106. The autothrottle retard initiation height may be determined using the aircraft's ground speed, the aircraft's vertical speed, and an aircraft vertical landing speed factor.

In some embodiments, determining the autothrottle retard initiation height includes calculating an integral of the aircraft vertical landing speed factor from throttle retard initiation to touchdown. Height above ground (z) may be related to vertical speed (VS) by $$\dot{z}=VS(t) \quad \text{(Equation 4)}$$

Integrating this equation from throttle reduction to touchdown yields $$ARIH=z(t_{TR})-z(t_{TD})=-\int_{t_{TR}}^{t_{TD}}VS(t)dt \quad \text{(Equation 5)}$$

where ARIH=autothrottle retard initiation height, $t_{TD}$=time at touchdown, $t_{TR}$=time at throttle retard, and VS(t) is the aircraft vertical landing speed factor. Because $z(t_{TD})$ is zero, the equation above yields the height at autothrottle retard. In some embodiments, $t_{TD}$ and $t_{TR}$ are chosen to achieve a desired landing profile.

In some embodiments, the aircraft's vertical landing speed factor represents a predetermined aircraft trajectory from the autothrottle retard initiation height to aircraft touchdown. FIG. 2A depicts a graph 200 of an aircraft vertical speed factor from the time of throttle reduction ($t_{TR}$) to time of touchdown ($t_{TR}$), in accordance with one embodiment.

In graph 200, the vertical speed factor provides a smooth trajectory from the approach value to the landing vertical speed. Before the time of flare initiation ($t_F$), VS(t) may be expressed as Equation 1.

In some embodiments, the aircraft's flight path angle may change during landing. In some embodiments, the aircraft's vertical landing speed factor at time t may be expressed as Equation 2.

Figure 2B:
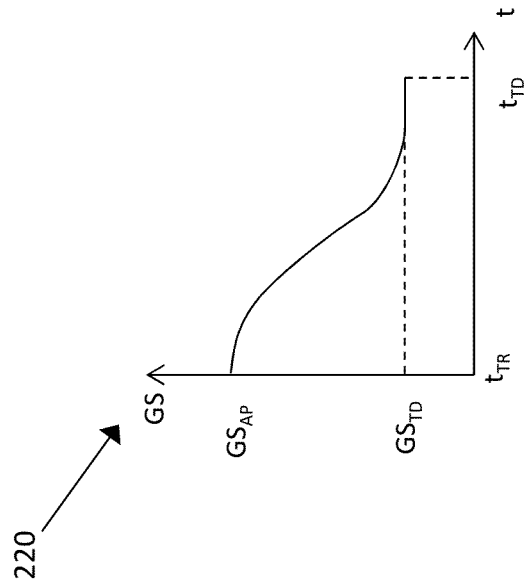
FIG. 2B depicts a graph of an aircraft ground speed factor from throttle reduction to touchdown, in accordance with one embodiment.
Figure 2A:
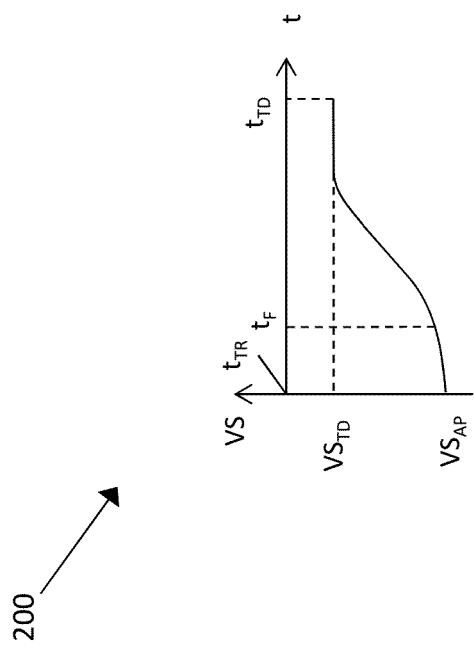
FIG. 2A depicts a graph of a vertical speed factor from throttle reduction to touchdown, in accordance with one embodiment.

FIG. 2B depicts a graph 220 of an aircraft ground speed factor from the time of throttle reduction ($t_{TR}$) to time of touchdown ($t_{TR}$), in accordance with one embodiment. $GS_{AP}$ is the aircraft's ground speed at approach and $GS_{TD}$ is the aircraft's ground speed at touchdown. Graph 220 may be used in conjunction with one of the equations described herein to determine an autothrottle retard initiation height.

Returning to FIG. 1, determining autothrottle retard initiation height 106 may include receiving the aircraft's weight as an input. In some embodiments, determining autothrottle retard initiation height 106 may be performed by a computer that receives aircraft ground speed and vertical speed as inputs.

Method 100 includes receiving the aircraft's height above ground 108. In some embodiments, aircraft height may be provided by a radar altimeter or a barometric altimeter coupled with a GPS system.

Method 100 includes initiating autothrottle retard 110. The autothrottle retard may be initiated when the aircraft's height above ground and the autothrottle retard initiation height are equal.

In some embodiments, method 100 may be performed at a predetermined height above the ground. For example, as the aircraft approaches landing, method 100 may be performed at 200 feet above the ground. In some embodiments, method 100 may be performed when the aircraft begins approach or may be initiated by the crew of the aircraft. In some embodiments, the method 100 is performed at a height that is determined based on landing or aircraft conditions.

Figure 3:
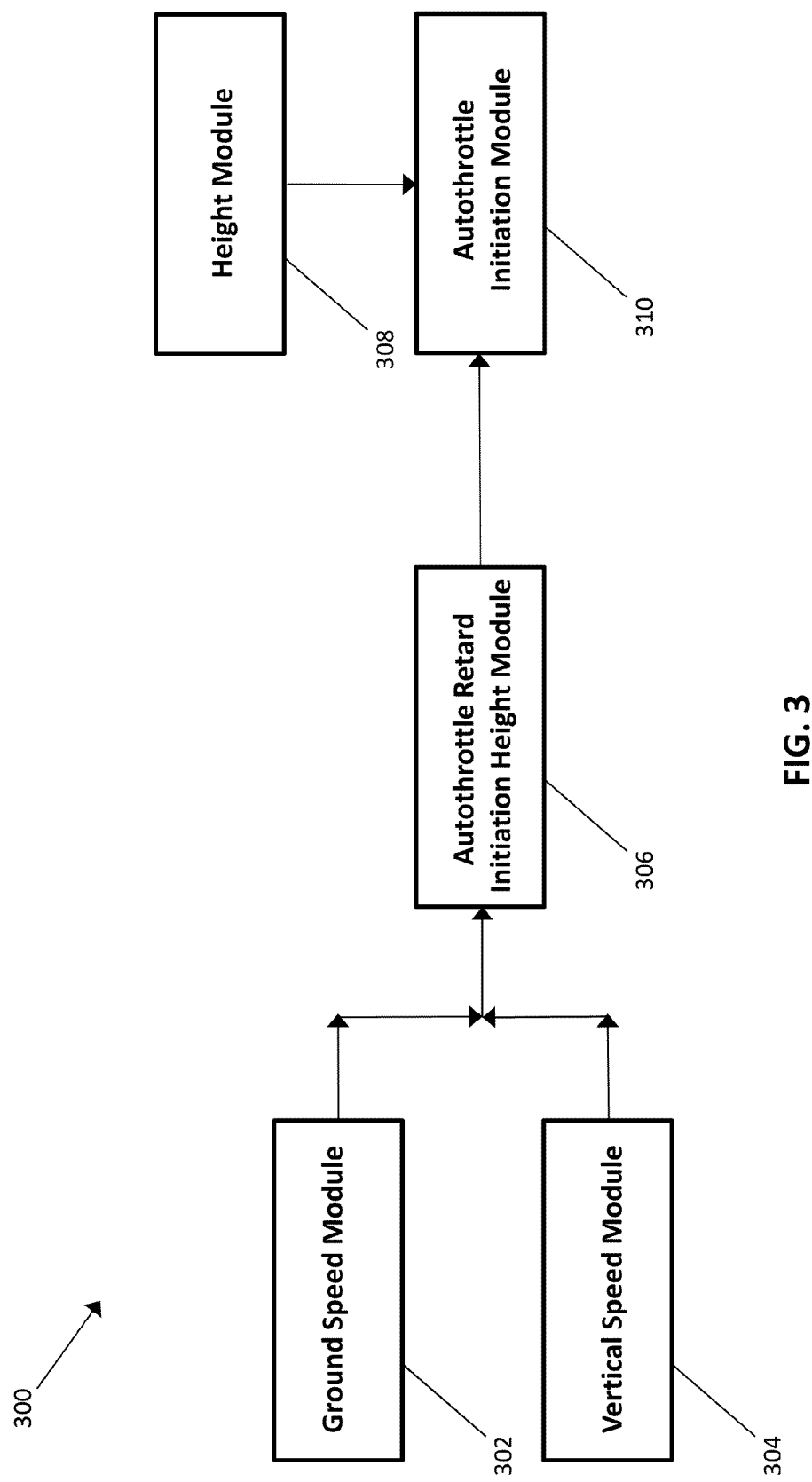
FIG. 3 depicts an autothrottle retard initiation system, in accordance with an embodiment.

FIG. 3 depicts an autothrottle retard initiation system 300, in accordance with an embodiment. Autothrottle retard system 300 may advantageously determine a height more suitable for a specific landing situation than the fixed height used in prior art systems.

Autothrottle retard initiation system 300 includes an aircraft ground speed module 302 that receives the aircraft ground speed. In some embodiments, aircraft ground speed module 302 receives an instantaneous aircraft ground speed. In some embodiments, the aircraft ground speed module receives an average aircraft ground speed.

Autothrottle retard initiation system 300 includes an aircraft vertical speed module 304 that receives the aircraft's vertical speed. In some embodiments, aircraft vertical speed module 304 receives the aircraft's inertial vertical speed.

Autothrottle retard initiation system 300 includes an autothrottle retard initiation height module 306 that determines autothrottle retard initiation height based on the aircraft's ground speed, the aircraft's vertical speed, and an aircraft vertical landing speed factor. In some embodiments, autothrottle retard initiation height module 306 integrates the aircraft vertical landing speed factor from throttle retard initiation to touchdown.

In some embodiments, the aircraft's vertical landing speed factor represents a predetermined aircraft trajectory from the autothrottle retard initiation height to aircraft touchdown. In some further embodiments the aircraft vertical landing speed factor at time t may be expressed as Equation 1.

In some embodiments, the aircraft's vertical landing speed factor at time t may be expressed as Equation 2.

Autothrottle retard initiation system 300 includes an aircraft height module 308 that receives the aircraft's height above ground and an autothrottle initiation module 310 that initiates autothrottle retard when the aircraft's height above ground and the autothrottle retard initiation height are equal.

Figure 4:
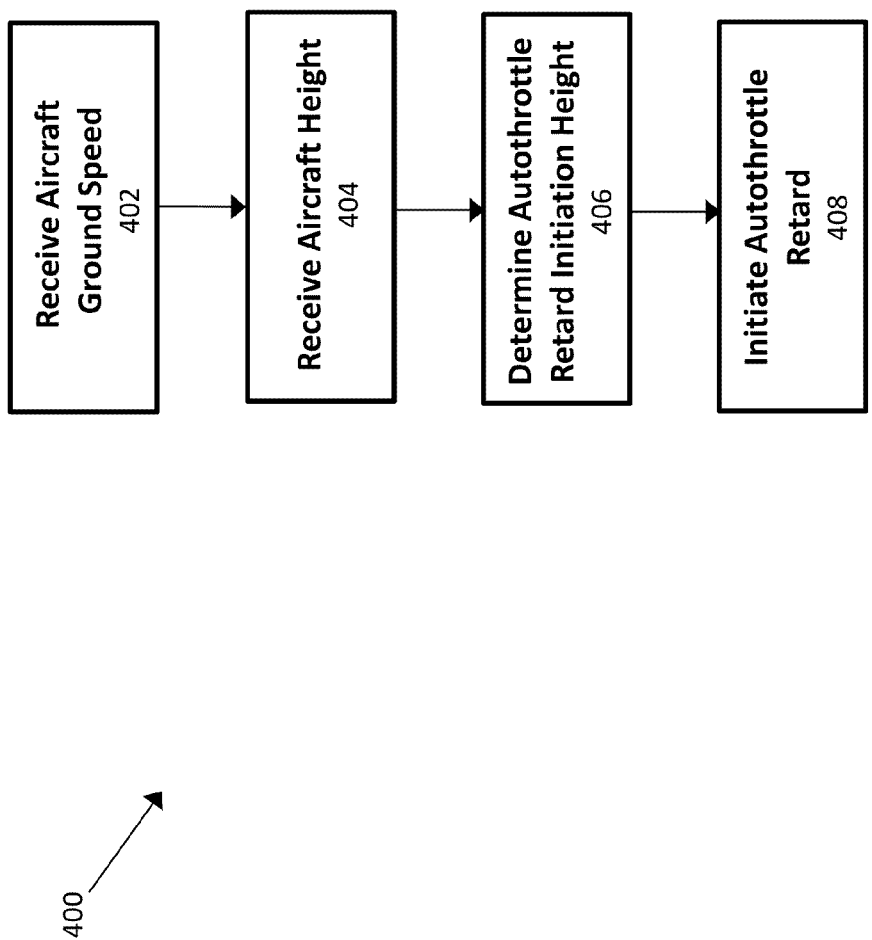
FIG. 4 depicts an autothrottle retard initiation method, in accordance with an embodiment.

In some embodiments, the height to initiate autothrottle retard is determined based on a factor that considers the aircraft's ground speed. FIG. 4 depicts a method 400 for initiating autothrottle retard, in accordance with an embodiment. Method 400 may advantageously determine a height more suitable for a specific landing situation than the fixed height used in prior art methods.

Method 400 includes receiving the aircraft's ground speed 402. In some embodiments, receiving the aircraft's ground speed includes receiving an instantaneous aircraft ground speed. In some embodiments, receiving the aircraft's ground speed includes receiving an average aircraft ground speed over a period of time. In some embodiments, the aircraft ground speed may be provided by an airspeed indicator, E6B flight computer, or similar device.

Method 400 includes receiving the aircraft's height above ground 404. In some embodiments, aircraft height may be provided by a radar altimeter or a barometric altimeter coupled with a GPS system.

Method 400 includes determining autothrottle retard initiation height 406. The autothrottle retard initiation height may be determined using the aircraft's ground speed and an autothrottle retard initiation height factor.

Figure 5:
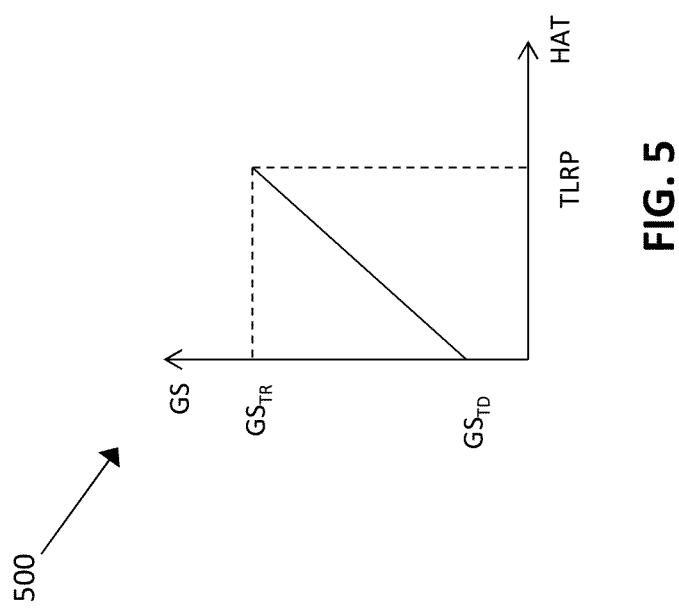
FIG. 5 depicts a graph of a relationship between ground speed and height above touchdown, in accordance with an embodiment.

In some embodiments, the autothrottle retard initiation height factor assumes the aircraft's inertial ground speed deceleration along the flight path ($A_{GS}$) is a constant and aircraft flight path angle (FPA) is a constant. FIG. 5 depicts a graph 500 of a relationship between ground speed and height above touchdown ("HAT") when $A_{GS}$ and FPA are constant, in accordance with an embodiment. Under these assumptions, the autothrottle retard initiation height factor may be expressed as Equation 3. $A_{GS}$ may be related to horizontal distance travelled ("x") by $$A_{GS} = \frac{GS_{TD}^2 - GS_{AP}^2}{2X} \quad \text{(Equation 6)}$$

As shown in FIG. 5, the horizontal distance travelled is related to autothrottle retard initiation height ("ARIH") by $$X = \frac{ARIH}{\tan(FPA)} \quad \text{(Equation 7)}$$

Substituting Equation 7 into Equation 6 gives Equation 3.

Returning to FIG. 4, determining autothrottle retard initiation height 406 may include receiving the aircraft's weight as an input. In some embodiments, determining autothrottle retard initiation height 406 may be performed by a computer that receives aircraft ground speed as an input.

Method 400 includes initiating autothrottle retard 408. The autothrottle retard may be initiated when the aircraft's height above ground and the autothrottle retard initiation height are equal.

In some embodiments, method 400 may be performed at a predetermined height above the ground. For example, as the aircraft approaches landing, method 400 may be performed at 200 feet above the ground. In some embodiments, method 400 may be performed when the aircraft begins approach or may be initiated by the crew of the aircraft. In some embodiments, the method 400 is performed at a height that is determined based on landing or aircraft conditions.

Figure 6:
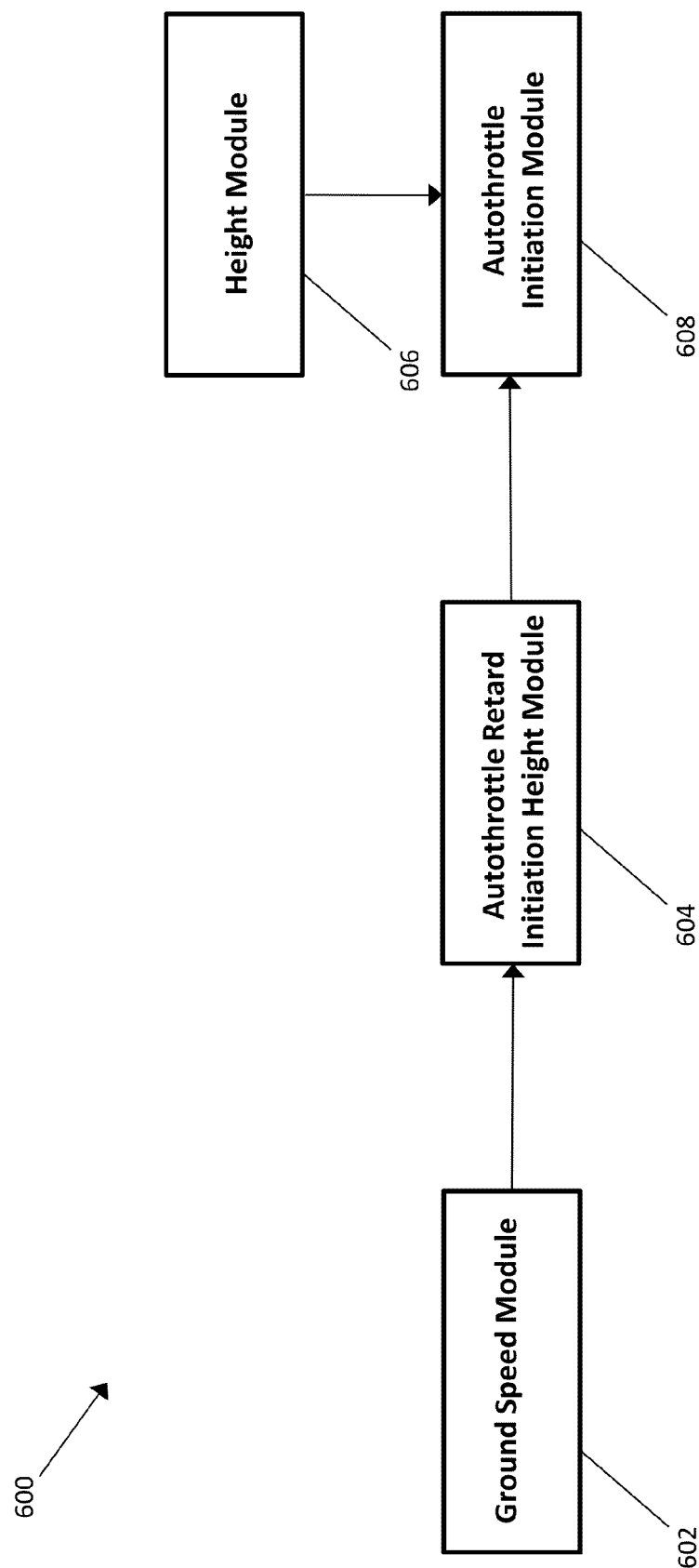
FIG. 6 depicts an autothrottle retard initiation system, in accordance with an embodiment.

FIG. 6 depicts an autothrottle retard initiation system 600, in accordance with an embodiment. Autothrottle retard system 600 may advantageously determine a height more suitable for a specific landing situation than the fixed height used in prior art systems.

Autothrottle retard initiation system 600 includes a ground speed module 602 that receives the aircraft's ground speed. In some embodiments, ground speed module 602 receives an instantaneous aircraft ground speed. In some embodiments, ground speed module 602 receives an average aircraft ground speed over a period of time.

Autothrottle retard initiation system 600 includes autothrottle retard initiation height module 604 that determines autothrottle retard initiation height. The autothrottle retard initiation height may be determined using the aircraft's ground speed and an autothrottle retard initiation height factor.

In some embodiments, the autothrottle retard initiation height factor assumes the aircraft inertial ground speed deceleration ($A_{GS}$) is a constant and aircraft flight path angle (FPA) is a constant. Under these assumptions, the autothrottle retard initiation height factor may be expressed as Equation 3.

Autothrottle retard initiation system 600 includes an aircraft height module 306 that receives the aircraft's height above ground and an autothrottle initiation module 308 that initiates autothrottle retard when the aircraft's height above ground and the autothrottle retard initiation height are equal.

In some embodiments, an autothrottle retard initiation height is determined based on aircraft weight and ground-speed. Advantageously, the systems and methods may determine an initiation height more suitable to a specific landing situation.

Figure 7:
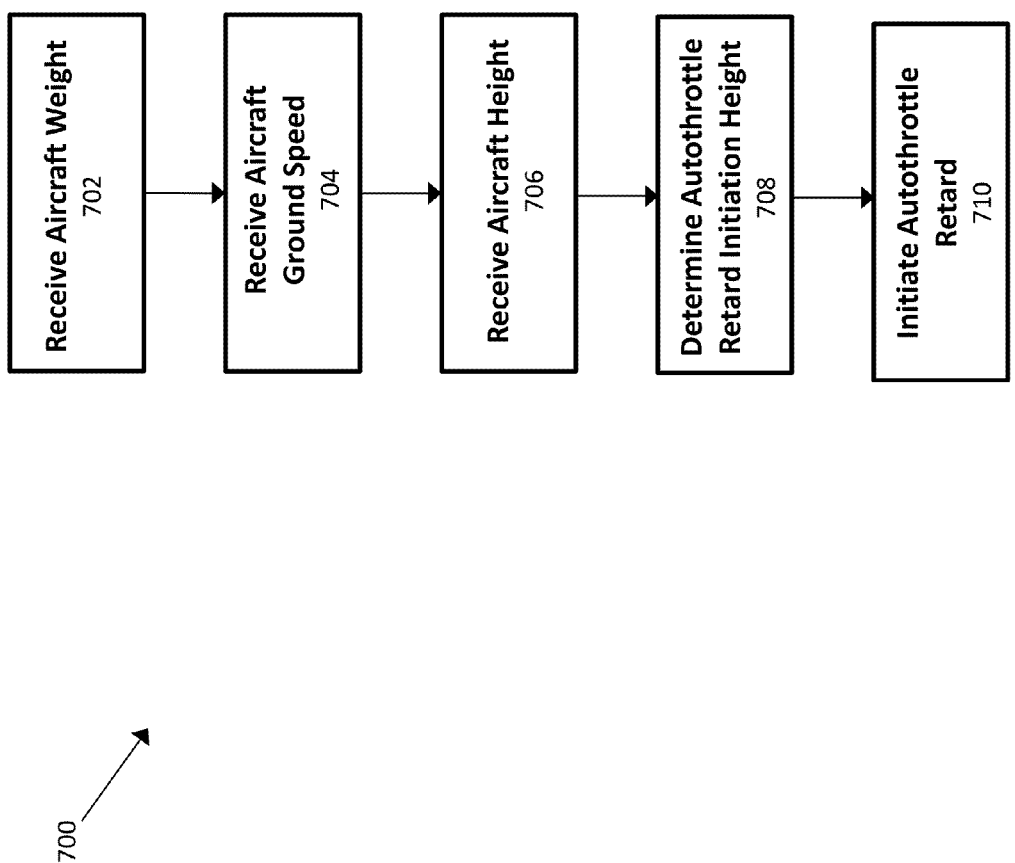
FIG. 7 depicts an autothrottle retard initiation method, in accordance with an embodiment.

FIG. 7 depicts a method 700 for initiating autothrottle retard, in accordance with an embodiment. Method 700 may advantageously determine a height more suitable for a specific landing situation than the fixed height used in prior art methods.

Method 700 includes receiving an aircraft weight 702. In some embodiments, receiving an aircraft weight 702 may include receiving manually entered data, receiving data from an aircraft sensor, or receiving data from an external sensor. In some embodiments, an aircraft's structural weight may stay the same, but cargo and fuel weight may vary from flight to flight. Such variations in weight may be accounted for by step 702.

Method 700 includes receiving an aircraft ground speed 704. In some embodiments, aircraft ground speed may be determined by the vector sum of the aircraft's true airspeed and the current wind speed and direction.

Method 700 includes receiving an aircraft height above ground 706. In some embodiments, aircraft height may be provided by a radar altimeter or a barometric altimeter coupled with a GPS system.

Method 700 includes determining an autothrottle retard initiation height based on the aircraft weight and aircraft ground speed 708. In some embodiments, determining autothrottle retard initiation height may be performed by a computer that receives aircraft weight and ground speed as inputs.

Method 700 includes initiating autothrottle retard when the aircraft height above ground and the autothrottle retard initiation height 710 are equal.

In some embodiments, method 700 includes adjusting aircraft throttles to reduce airspeed at not greater than two knots per second after initiating autothrottle retard. In further embodiments, method 700 includes discontinuing autothrottle retard when airspeed has decreased by ten knots or greater after initiating autothrottle retard. In some embodiments, method 700 includes preventing throttle advancement after initiating autothrottle retard. In some embodiments, method 700 includes identifying contact between aircraft landing gear and a runway and retarding aircraft throttles to idle after contact between the aircraft landing gear and the runway.

Figure 8:
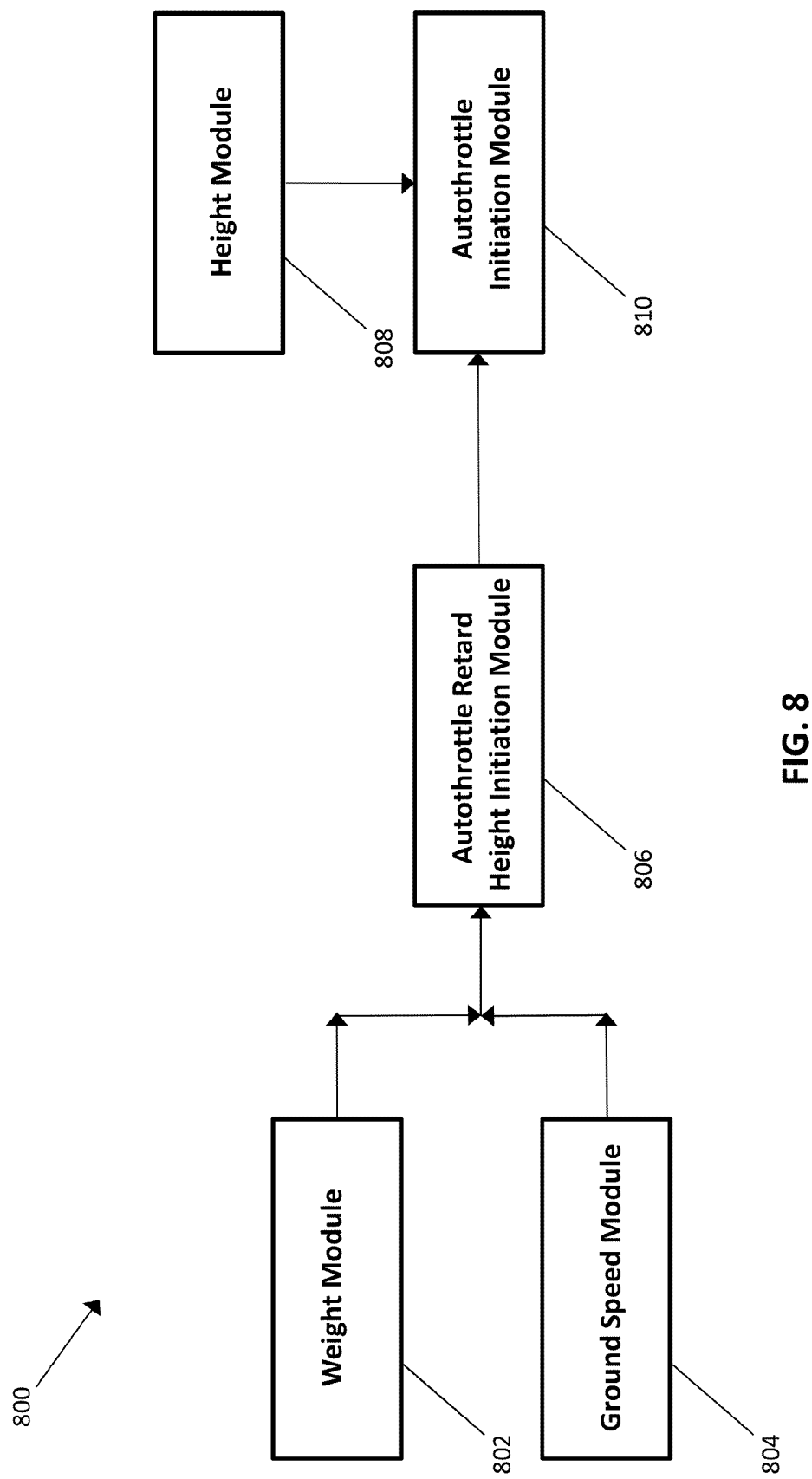
FIG. 8 depicts an autothrottle retard initiation system, in accordance with an embodiment.

FIG. 8 depicts an autothrottle retard initiation system 800, in accordance with an embodiment. By considering an aircraft's weight and ground-speed in determining retard initiation height, system 800 may advantageously determine a height more suitable for a specific landing situation.

System 800 includes a weight module 802 that receives an aircraft weight. In some embodiments, weight module 802 may include manual inputs for entering data, an aircraft sensor, or a sensor external to the aircraft.

System 800 includes a ground speed module 804 that receives an aircraft ground speed. Ground speed module 804 may include a true airspeed indicator and a computer for determining the vector sum of the aircraft's true airspeed and the current wind speed and direction.

System 800 includes an autothrottle retard initiation height module 806 that determines an autothrottle retard initiation height based on information received from the weight module 802 and the ground speed module 804. In some embodiments, autothrottle retard initiation height module 806 may include a computer.

System 800 includes a height module 808 that receives an aircraft height above ground. In some embodiments, height 808 may include a radar altimeter or a barometric altimeter coupled with a GPS system.

System 800 includes an autothrottle initiation module 810 that initiates autothrottle retard when the aircraft height above ground and the autothrottle retard initiation height are equal.

In some embodiments, system 800 includes another module (not shown) that adjusts aircraft throttles to reduce airspeed at not greater than two knots per second after the autothrottle initiation module 810 initiates autothrottle retard. In some embodiments, system 800 includes another module (not shown) that discontinues autothrottle retard when airspeed has decreased by ten knots or greater after the autothrottle initiation module 810 initiates autothrottle retard. In some embodiments, system 800 includes another module (not shown) that prevents throttle advancement after the autothrottle initiation module 810 initiates autothrottle retard. In some embodiments, system 800 includes another module (not shown) that identifies contact between aircraft landing gear and a runway and a further module (not shown) that retards aircraft throttles to idle after contact between the aircraft landing gear and the runway.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An autothrottle retard initiation method comprising:
receiving an aircraft ground speed,
receiving an aircraft vertical speed,
determining an autothrottle retard initiation height based on the aircraft ground speed, the aircraft vertical speed, and an aircraft vertical landing speed factor,
receiving an aircraft height above ground,
initiating autothrottle retard when the aircraft height above ground and the autothrottle retard initiation height are equal, and
reducing airspeed at a rate not greater than two knots per second after initiating autothrottle retard.

2. The method of claim 1, wherein determining the autothrottle retard initiation height comprises calculating an integral of the aircraft vertical landing speed factor from throttle retard initiation to touchdown.

3. The method of claim 1, wherein the aircraft vertical landing speed factor represents a predetermined aircraft trajectory from the autothrottle retard initiation height to aircraft touchdown.

4. The method of claim 3, wherein the aircraft vertical landing speed factor at time t is expressed as $$GS(t)\frac{VS_{AP}}{GS_{AP}}$$

where GS(t) represents an aircraft ground speed factor at time t,
$VS_{AP}$ represents an aircraft vertical speed during approach, and
$GS_{AP}$ represents an aircraft ground speed during approach.

5. The method of claim 3, wherein the aircraft vertical landing speed factor at time t is expressed as $$GS(t)\tan(FPA(t))$$

where GS(t) represents an aircraft ground speed factor at time t and
FPA(t) represents an aircraft flight path angle factor at time t.

6. The method of claim 1, wherein receiving the aircraft vertical speed comprises receiving an aircraft inertial vertical speed.

7. The method of claim 1, wherein receiving the aircraft ground speed comprises receiving an instantaneous aircraft ground speed.

8. The method of claim 1, wherein receiving the aircraft ground speed comprises receiving an average aircraft ground speed.

9. The method of claim 1, wherein receiving the aircraft vertical landing speed factor comprises receiving an aircraft weight.

10. An autothrottle retard initiation system comprising:
a first module that receives an aircraft ground speed,
a second module that receives an aircraft vertical speed,
a third module that determines an autothrottle retard initiation height based on the aircraft ground speed, the aircraft vertical speed, and an aircraft vertical landing speed factor,
a fourth module that receives an aircraft height above ground,
a fifth module that initiates autothrottle retard when the aircraft height above ground and the autothrottle retard initiation height are equal, and
a sixth module that reduces airspeed at a rate not greater than two knots per second after the fifth module initiates autothrottle retard.

11. The system of claim 10, wherein the third module calculates an integral of the aircraft vertical landing speed factor from throttle retard initiation to touchdown.

12. The system of claim 10, wherein the aircraft vertical landing speed factor represents a predetermined aircraft trajectory from the autothrottle retard initiation height to aircraft touchdown.

13. The system of claim 12, wherein the aircraft vertical landing speed factor at time t is expressed as $$GS(t)\frac{VS_{AP}}{GS_{AP}}$$

where GS(t) represents an aircraft ground speed factor at time t,
VS$_{AP}$ represents an aircraft vertical speed during approach, and
GS$_{AP}$ represents an aircraft ground speed during approach.

14. The system of claim 12, wherein the aircraft vertical landing speed factor at time t is expressed as $$GS(t)\tan(FPA(t))$$

where GS(t) represents an aircraft ground speed factor at time t and
FPA(t) represents an aircraft flight path angle factor at time t.

15. The system of claim 10, wherein the second module receives an aircraft inertial vertical speed.

16. The system of claim 10, wherein the first module receives an instantaneous aircraft ground speed.

17. The system of claim 10, wherein the first module receives an average aircraft ground speed.

18. The system of claim 10, wherein the aircraft vertical landing speed factor comprises an aircraft weight.

19. An autothrottle retard initiation method comprising:
receiving an aircraft ground speed,
determining an autothrottle retard initiation height based on the aircraft ground speed and an autothrottle retard initiation height factor,
receiving an aircraft height above ground,
initiating autothrottle retard when the aircraft height above ground and the autothrottle retard initiation height are equal, and
reducing airspeed at a rate not greater than two knots per second after initiating autothrottle retard.

20. The method of claim 19, wherein the autothrottle retard initiation height factor is expressed as $$\frac{GS_{AP}^2 - GS_{TD}^2}{2A_{GS}}\tan(FPA)$$

where GS represents aircraft ground speed,
GS$_{TD}$ represents aircraft ground speed at touchdown,
A$_{GS}$ represents a constant aircraft inertial ground speed deceleration, and
FPA represents a constant aircraft flight path angle.

21. An autothrottle retard initiation system comprising:
a first module that receives an aircraft ground speed,
a second module that determines an autothrottle retard initiation height based on the aircraft ground speed and an autothrottle retard initiation height factor,
a third module that receives an aircraft height above ground,
a fourth module that initiates autothrottle retard when the aircraft height above ground and the autothrottle retard initiation height are equal, and
a fifth module that reduces airspeed at a rate not greater than two knots per second after the fourth module initiates autothrottle retard.

22. The method of claim 21, wherein the autothrottle retard initiation height factor is expressed as $$\frac{GS_{AP}^2 - GS_{TD}^2}{2A_{GS}}\tan(FPA)$$

where GS represents aircraft ground speed,
GS$_{TD}$ represents aircraft ground speed at touchdown,
A$_{GS}$ represents a constant aircraft inertial ground speed deceleration, and
FPA represents a constant aircraft flight path angle.

23. An autothrottle retard initiation method comprising:
receiving an aircraft weight,
receiving an aircraft ground speed,
receiving an aircraft height above ground,
determining an autothrottle retard initiation height based on the aircraft weight and aircraft ground speed,
initiating autothrottle retard when the aircraft height above ground and the autothrottle retard initiation height are equal, and
reducing airspeed at a rate not greater than two knots per second after initiating autothrottle retard.

24. The method of claim 23 comprising: discontinuing autothrottle retard when airspeed has decreased by ten knots or greater after initiating autothrottle retard.

25. The method of claim 23 comprising: preventing throttle advancement after initiating autothrottle retard.

26. The method of claim 23 comprising: identifying contact between aircraft landing gear and a runway and retarding aircraft throttles to idle after contact between the aircraft landing gear and the runway.

27. The method of claim 23 wherein receiving the aircraft weight comprises at least one of receiving manually entered data, receiving data from an aircraft sensor, and receiving data from an external sensor.

28. An autothrottle retard initiation system comprising:
a first module that receives an aircraft weight,
a second module that receives an aircraft ground speed,
a third module that receives an aircraft height above ground,
a fourth module that determines an autothrottle retard initiation height based on inputs received from the first module and the second module,
a fifth module that initiates autothrottle retard when the aircraft height above ground and the autothrottle retard initiation height are equal, and
a sixth module that reduces airspeed at a rate not greater than two knots per second after the fifth module initiates autothrottle retard.

29. The system of claim 28 comprising a seventh module that discontinues autothrottle retard when airspeed has decreased by at ten knots or greater after the fifth module initiates autothrottle retard.

30. The system of claim 28 comprising an eighth module that prevents throttle advancement after the fifth module initiates autothrottle retard.

31. The system of claim 28 comprising a ninth module that identifies contact between aircraft landing gear and a runway and a tenth module that retards aircraft throttles to idle when the ninth module identifies contact between the aircraft landing gear and the runway.

32. The system of claim 28 wherein the first module receives the aircraft weight through at least one of manually entered data, data from an aircraft sensor, and data from an external sensor.

33. An autothrottle retard initiation method comprising:
receiving an aircraft ground speed,
receiving an aircraft vertical speed,
determining an autothrottle retard initiation height based on the aircraft ground speed, the aircraft vertical speed, and an aircraft vertical landing speed factor,
receiving an aircraft height above ground, initiating autothrottle retard when the aircraft height above ground and the autothrottle retard initiation height are equal, and discontinuing autothrottle retard when airspeed has decreased by ten knots or greater after initiating autothrottle retard.

34. The method of claim 33, wherein determining the autothrottle retard initiation height comprises calculating an integral of the aircraft vertical landing speed factor from throttle retard initiation to touchdown.

35. The method of claim 33, wherein the aircraft vertical landing speed factor represents a predetermined aircraft trajectory from the autothrottle retard initiation height to aircraft touchdown.

36. The method of claim 35, wherein the aircraft vertical landing speed factor at time t is expressed as $$GS(t)\frac{VS_{AP}}{GS_{AP}}$$

where GS(t) represents an aircraft ground speed factor at time t,
$VS_{AP}$ represents an aircraft vertical speed during approach, and
$GS_{AP}$ represents an aircraft ground speed during approach.

37. The method of claim 35, wherein the aircraft vertical landing speed factor at time t is expressed as $$GS(t)\tan(FPA(t))$$

where GS(t) represents an aircraft ground speed factor at time t and
FPA(t) represents an aircraft flight path angle factor at time t.

38. The method of claim 33, wherein receiving the aircraft vertical speed comprises receiving an aircraft inertial vertical speed.

39. The method of claim 33, wherein receiving the aircraft ground speed comprises receiving an instantaneous aircraft ground speed.

40. The method of claim 33, wherein receiving the aircraft ground speed comprises receiving an average aircraft ground speed.

41. The method of claim 33, wherein receiving the aircraft vertical landing speed factor comprises receiving an aircraft weight.

42. An autothrottle retard initiation system comprising:
a first module that receives an aircraft ground speed,
a second module that receives an aircraft vertical speed,
a third module that determines an autothrottle retard initiation height based on the aircraft ground speed, the aircraft vertical speed, and an aircraft vertical landing speed factor,
a fourth module that receives an aircraft height above ground,
a fifth module that initiates autothrottle retard when the aircraft height above ground and the autothrottle retard initiation height are equal, and
a sixth module that discontinues autothrottle retard when airspeed has decreased by ten knots or greater after the fifth module initiates autothrottle retard.

43. The system of claim 42, wherein the third module calculates an integral of the aircraft vertical landing speed factor from throttle retard initiation to touchdown.

44. The system of claim 42, wherein the aircraft vertical landing speed factor represents a predetermined aircraft trajectory from the autothrottle retard initiation height to aircraft touchdown.

45. The system of claim 44, wherein the aircraft vertical landing speed factor at time t is expressed as $$GS(t)\frac{VS_{AP}}{GS_{AP}}$$

where GS(t) represents an aircraft ground speed factor at time t,
$VS_{AP}$ represents an aircraft vertical speed during approach, and
$GS_{AP}$ represents an aircraft ground speed during approach.

46. The system of claim 44, wherein the aircraft vertical landing speed factor at time t is expressed as $$GS(t)\tan(FPA(t))$$

where GS(t) represents an aircraft ground speed factor at time t and
FPA(t) represents an aircraft flight path angle factor at time t.

47. The system of claim 42, wherein the second module receives an aircraft inertial vertical speed.

48. The system of claim 42, wherein the first module receives an instantaneous aircraft ground speed.

49. The system of claim 42, wherein the first module receives an average aircraft ground speed.

50. The system of claim 42, wherein the aircraft vertical landing speed factor comprises an aircraft weight.

51. An autothrottle retard initiation method comprising:
receiving an aircraft ground speed,
determining an autothrottle retard initiation height based on the aircraft ground speed and an autothrottle retard initiation height factor,
receiving an aircraft height above ground,
initiating autothrottle retard when the aircraft height above ground and the autothrottle retard initiation height are equal, and
discontinuing autothrottle retard when airspeed has decreased by ten knots or greater after initiating autothrottle retard.

52. The method of claim 51, wherein the autothrottle retard initiation height factor is expressed as $$\frac{GS_{AP}^2 - GS_{TD}^2}{2A_{GS}}\tan(FPA)$$

where GS represents aircraft ground speed,
$GS_{TD}$ represents aircraft ground speed at touchdown,
$A_{GS}$ represents a constant aircraft inertial ground speed deceleration, and
FPA represents a constant aircraft flight path angle.

53. An autothrottle retard initiation system comprising:
a first module that receives an aircraft ground speed,
a second module that determines an autothrottle retard initiation height based on the aircraft ground speed and an autothrottle retard initiation height factor,
a third module that receives an aircraft height above ground, a fourth module that initiates autothrottle retard when the aircraft height above ground and the autothrottle retard initiation height are equal, and a fifth module that discontinues autothrottle retard when airspeed has decreased by ten knots or greater after a fourth module initiates autothrottle retard.

54. The method of claim 53, wherein the autothrottle retard initiation height factor is expressed as $$\frac{GS_{AP}^2 - GS_{TD}^2}{2A_{GS}}\tan(FPA)$$

where GS represents aircraft ground speed,
$GS_{TD}$ represents aircraft ground speed at touchdown,
$A_{GS}$ represents a constant aircraft inertial ground speed deceleration, and
FPA represents a constant aircraft flight path angle.

55. An autothrottle retard initiation method comprising:
receiving an aircraft weight,
receiving an aircraft ground speed,
receiving an aircraft height above ground,
determining an autothrottle retard initiation height based on the aircraft weight and aircraft ground speed,
initiating autothrottle retard when the aircraft height above ground and the autothrottle retard initiation height are equal, and
discontinuing autothrottle retard when airspeed has decreased by ten knots or greater after initiating autothrottle retard.

56. The method of claim 55 comprising: preventing throttle advancement after initiating autothrottle retard.

57. The method of claim 55 comprising: identifying contact between aircraft landing gear and a runway and retarding aircraft throttles to idle after contact between the aircraft landing gear and the runway.

58. The method of claim 55 wherein receiving the aircraft weight comprises at least one of receiving manually entered data, receiving data from an aircraft sensor, and receiving data from an external sensor.

59. An autothrottle retard initiation system comprising:
a first module that receives an aircraft weight,
a second module that receives an aircraft ground speed,
a third module that receives an aircraft height above ground,
a fourth module that determines an autothrottle retard initiation height based on inputs received from the first module and the second module,
a fifth module that initiates autothrottle retard when the aircraft height above ground and the autothrottle retard initiation height are equal, and
a sixth module that discontinues autothrottle retard when airspeed has decreased by ten knots or greater after the fifth module autothrottle retard.

60. The system of claim 59 comprising a seventh module that prevents throttle advancement after the fifth module initiates autothrottle retard.

61. The system of claim 59 comprising an eight module that identifies contact between aircraft landing gear and a runway and a ninth module that retards aircraft throttles to idle when the eighth module identifies contact between the aircraft landing gear and the runway.

62. The system of claim 59 wherein the first module receives the aircraft weight through at least one of manually entered data, data from an aircraft sensor, and data from an external sensor.

63. An autothrottle retard initiation method comprising:
receiving an aircraft ground speed,
receiving an aircraft vertical speed,
determining an autothrottle retard initiation height based on the aircraft ground speed, the aircraft vertical speed, and an aircraft vertical landing speed factor,
receiving an aircraft height above ground,
initiating autothrottle retard when the aircraft height above ground and the autothrottle retard initiation height are equal, and
preventing throttle advancement after initiating autothrottle retard.

64. The method of claim 63, wherein determining the autothrottle retard initiation height comprises calculating an integral of the aircraft vertical landing speed factor from throttle retard initiation to touchdown.

65. The method of claim 63, wherein the aircraft vertical landing speed factor represents a predetermined aircraft trajectory from the autothrottle retard initiation height to aircraft touchdown.

66. The method of claim 65, wherein the aircraft vertical landing speed factor at time t is expressed as $$GS(t)\frac{VS_{AP}}{GS_{AP}}$$

where GS(t) represents an aircraft ground speed factor at time t,
$VS_{AP}$ represents an aircraft vertical speed during approach, and
$GS_{AP}$ represents an aircraft ground speed during approach.

67. The method of claim 65, wherein the aircraft vertical landing speed factor at time t is expressed as $GS(t)\tan(FPA(t))$ where GS(t) represents an aircraft ground speed factor at time t and
FPA(t) represents an aircraft flight path angle factor at time t.

68. The method of claim 65, wherein receiving the aircraft vertical speed comprises receiving an aircraft inertial vertical speed.

69. The method of claim 65, wherein receiving the aircraft ground speed comprises receiving an instantaneous aircraft ground speed.

70. The method of claim 65, wherein receiving the aircraft ground speed comprises receiving an average aircraft ground speed.

71. The method of claim 65, wherein receiving the aircraft vertical landing speed factor comprises receiving an aircraft weight.

72. An autothrottle retard initiation system comprising:
a first module that receives an aircraft ground speed,
a second module that receives an aircraft vertical speed,
a third module that determines an autothrottle retard initiation height based on the aircraft ground speed, the aircraft vertical speed, and an aircraft vertical landing speed factor,
a fourth module that receives an aircraft height above ground,
a fifth module that initiates autothrottle retard when the aircraft height above ground and the autothrottle retard initiation height are equal, and
a sixth module that prevents throttle advancement after the fifth module initiates autothrottle retard.

73. The system of claim 72, wherein the third module calculates an integral of the aircraft vertical landing speed factor from throttle retard initiation to touchdown.

74. The system of claim 72, wherein the aircraft vertical landing speed factor represents a predetermined aircraft trajectory from the autothrottle retard initiation height to aircraft touchdown.

75. The system of claim 74, wherein the aircraft vertical landing speed factor at time t is expressed as $$GS(t)\frac{VS_{AP}}{GS_{AP}}$$

where GS(t) represents an aircraft ground speed factor at time t,
$VS_{AP}$ represents an aircraft vertical speed during approach, and
$GS_{AP}$ represents an aircraft ground speed during approach.

76. The system of claim 74, wherein the aircraft vertical landing speed factor at time t is expressed as $$GS(t)\tan(FPA(t))$$

where GS(t) represents an aircraft ground speed factor at time t and
FPA(t) represents an aircraft flight path angle factor at time t.

77. The system of claim 72, wherein the second module receives an aircraft inertial vertical speed.

78. The system of claim 72, wherein the first module receives an instantaneous aircraft ground speed.

79. The system of claim 72, wherein the first module receives an average aircraft ground speed.

80. The system of claim 72, wherein the aircraft vertical landing speed factor comprises an aircraft weight.

81. An autothrottle retard initiation method comprising:
receiving an aircraft ground speed,
determining an autothrottle retard initiation height based on the aircraft ground speed and an autothrottle retard initiation height factor,
receiving an aircraft height above ground,
initiating autothrottle retard when the aircraft height above ground and the autothrottle retard initiation height are equal, and
preventing throttle advancement after initiating autothrottle retard.

82. The method of claim 81, wherein the autothrottle retard initiation height factor is expressed as $$\frac{GS_{AP}^2 - GS_{TD}^2}{2A_{GS}}\tan(FPA)$$

where GS represents aircraft ground speed,
$GS_{TD}$ represents aircraft ground speed at touchdown,
$A_{GS}$ represents a constant aircraft inertial ground speed deceleration, and
FPA represents a constant aircraft flight path angle.

83. An autothrottle retard initiation system comprising:
a first module that receives an aircraft ground speed,
a second module that determines an autothrottle retard initiation height based on the aircraft ground speed and an autothrottle retard initiation height factor,
a third module that receives an aircraft height above ground,
a fourth module that initiates autothrottle retard when the aircraft height above ground and the autothrottle retard initiation height are equal, and
a fifth module that prevents throttle advancement after the sixth module initiates autothrottle retard.

84. The method of claim 83, wherein the autothrottle retard initiation height factor is expressed as $$\frac{GS_{AP}^2 - GS_{TD}^2}{2A_{GS}}\tan(FPA)$$

where GS represents aircraft ground speed,
$GS_{TD}$ represents aircraft ground speed at touchdown,
$A_{GS}$ represents a constant aircraft inertial ground speed deceleration, and
FPA represents a constant aircraft flight path angle.

85. An autothrottle retard initiation method comprising:
receiving an aircraft weight,
receiving an aircraft ground speed,
receiving an aircraft height above ground,
determining an autothrottle retard initiation height based on the aircraft weight and aircraft ground speed,
initiating autothrottle retard when the aircraft height above ground and the autothrottle retard initiation height are equal, and
preventing throttle advancement after initiating autothrottle retard.

86. The method of claim 85 comprising: identifying contact between aircraft landing gear and a runway and retarding aircraft throttles to idle after contact between the aircraft landing gear and the runway.

87. The method of claim 85 wherein receiving the aircraft weight comprises at least one of receiving manually entered data, receiving data from an aircraft sensor, and receiving data from an external sensor.

88. An autothrottle retard initiation system comprising:
a first module that receives an aircraft weight,
a second module that receives an aircraft ground speed,
a third module that receives an aircraft height above ground,
a fourth module that determines an autothrottle retard initiation height based on inputs received from the first module and the second module,
a fifth module that initiates autothrottle retard when the aircraft height above ground and the autothrottle retard initiation height are equal, and
a sixth module that prevents throttle advancement after the fifth module initiates autothrottle retard.

89. The system of claim 88 comprising a seventh module that identifies contact between aircraft landing gear and a runway and an eighth module that retards aircraft throttles to idle when the seventh module identifies contact between the aircraft landing gear and the runway.

90. The system of claim 88 wherein the first module receives the aircraft weight through at least one of manually entered data, data from an aircraft sensor, and data from an external sensor.

* * * * *